(12) United States Patent
Azhar et al.

(10) Patent No.: US 12,682,457 B2
(45) Date of Patent: Jul. 14, 2026

(54) METHODS AND SYSTEMS FOR PROCESSING MEDICAL IMAGES

(71) Applicant: Siemens Healthcare Diagnostics Inc., Tarrytown, NY (US)

(72) Inventors: Mohiudeen Azhar, Bangalore (IN); Abhijeet A. Joshi, Bangalore (IN); Vaishnav Ram Savarni K R, Bangalore (IN)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 219 days.

(21) Appl. No.: 18/573,108

(22) PCT Filed: Jul. 6, 2021

(86) PCT No.: PCT/IB2021/056032
§ 371 (c)(1),
(2) Date: Dec. 21, 2023

(87) PCT Pub. No.: WO2023/281294
PCT Pub. Date: Jan. 12, 2023

(65) Prior Publication Data
US 2024/0378723 A1     Nov. 14, 2024

(51) Int. Cl.
*G06T 7/00* (2017.01)
*G06T 3/4053* (2024.01)
(Continued)

(52) U.S. Cl.
CPC .......... *G06T 7/0012* (2013.01); *G06T 3/4053* (2013.01); *G06T 7/11* (2017.01);
(Continued)

(58) Field of Classification Search
CPC ....... G06T 7/0012; G06T 3/4053; G06T 7/11; G06T 7/136; G06T 7/155;
(Continued)

(56) References Cited

U.S. PATENT DOCUMENTS

2009/0324118 A1* 12/2009 Maslov ................. G06T 3/4053
                                              382/254
2011/0007954 A1*  1/2011 Suehling ................ G06V 40/10
                                              382/128
(Continued)

OTHER PUBLICATIONS

Alomari, Yazan M., et al. "Automatic detection and quantification of WBCs and RBCs using iterative structured circle detection algorithm." Computational and mathematical methods in medicine 2014 (2014). pp. 1-18.
(Continued)

*Primary Examiner* — Premal R Patel
(74) *Attorney, Agent, or Firm* — Lempia Summerfield Katz LLC

(57) ABSTRACT

A method and a system for processing medical images are provided. In one aspect, the method includes receiving the medical image, wherein the medical image includes a plurality of objects, and wherein the medical image is a low-resolution image. Further, the method includes segmenting at least one object from the plurality of objects from the medical image. Additionally, the method includes identifying at least one region of interest in the medical image, wherein the region of interest includes the at least one object, and wherein the at least one object is clinically relevant. Furthermore, the method includes generating a high-resolution image of the region of interest. The method also includes displaying the high-resolution image of the region of interest on a display unit.

12 Claims, 4 Drawing Sheets

(51) Int. Cl.

| | |
|---|---|
| *G06T 7/11* | (2017.01) |
| *G06T 7/136* | (2017.01) |
| *G06T 7/155* | (2017.01) |

(52) U.S. Cl.
CPC .............. *G06T 7/136* (2017.01); *G06T 7/155* (2017.01); *G06T 2207/10024* (2013.01); *G06T 2207/10056* (2013.01); *G06T 2207/30096* (2013.01)

(58) Field of Classification Search
CPC . G06T 2207/10024; G06T 2207/10056; G06T 2207/30096
See application file for complete search history.

(56) References Cited

U.S. PATENT DOCUMENTS

| | | | | |
|---|---|---|---|---|
| 2012/0087562 A1* | 4/2012 | Isaacs | .................... | G16H 20/40 |
| | | | | 382/128 |
| 2016/0063720 A1* | 3/2016 | Han | .................... | G06F 18/2411 |
| | | | | 382/131 |
| 2016/0216503 A1* | 7/2016 | Kim | .................... | G02B 21/0076 |
| 2018/0308237 A1* | 10/2018 | Seong | .................... | G16H 50/20 |
| 2020/0232019 A1* | 7/2020 | Erber | .................. | C12Q 1/6841 |
| 2020/0405148 A1* | 12/2020 | Tran | ..................... | A61B 3/0008 |
| 2021/0151170 A1* | 5/2021 | Shi | ........................ | G16H 30/40 |

OTHER PUBLICATIONS

Angel Arul Jothi, J., and V. Mary Anita Rajam. "A survey on automated cancer diagnosis from histopathology images." Artificial Intelligence Review 48 (2017): 31-81.

Dhanachandra, Nameirakpam, and Yambem Jina Chanu. "A survey on image segmentation methods using clustering techniques." European Journal of Engineering and Technology Research 2.1 (2017): 15-20.

Dong, Zhihua, et al. "High-performance multi-mode ptychography reconstruction on distributed GPUs." 2018 New York Scientific Data Summit (NYSDS). IEEE, 2018. pp. 1-5.

Elizabeth, J. Ruby, and S. Ebenezer Juliet. "A survey on various segmentation methods in medical imaging." International Journal of Emerging Trends in Engineering Research 7.11 (2019): 1-5.

Evangelidis, Georgios D., and Emmanouil Z. Psarakis. "Parametric image alignment using enhanced correlation coefficient maximization." IEEE transactions on pattern analysis and machine intelligence 30.10 (2008): 1858-1865.

Gonzalez, Rafael C. "Digital image processing". Pearson Education India, 2009. pp. 1-976.

Guan, Ziqiao, et al. "Ptychonet: Fast and high quality phase retrieval for ptychography". No. BNL-213637-2020-FORE. Brookhaven National Lab.(BNL), Upton, NY (United States), 2019. pp. 1-15.

Hua, Xia, et al. "Leukocyte super-resolution via geometry prior and structural consistency." Journal of Biomedical Optics 25.10 (2020): 106501-106501.

International Search Report & Written Opinion for International Application No. PCT/IB2021/056032 mailed on Apr. 7, 2022.

Wang, Xing, et al. "SO-YOLO based WBC detection with Fourier ptychographic microscopy." Ieee Access 6 (2018): 51566-51576.

Zhang, Jizhou, et al. "Efficient colorful Fourier ptychographic microscopy reconstruction with wavelet fusion." IEEE Access 6 (2018): 31729-31739.

* cited by examiner

300

METHODS AND SYSTEMS FOR PROCESSING MEDICAL IMAGES

The present patent document is a § 371 nationalization of PCT Application Serial No. PCT/IB2021/056032, filed Jul. 6, 2021, designating the United States, which is incorporated by reference in its entirety.

TECHNICAL FIELD

The present disclosure relates to a method and a system for processing a medical image.

BACKGROUND

High resolution microscopy is an indispensable tool for clinicians to analyze patient samples such as blood, urine sediment, tissue pathology samples, etc. Fourier ptychography microscopy is a novel, low-cost, and oil-free high-resolution microscope. Fourier ptychography microscopy enables computationally obtaining high resolution images with multiple low-resolution images with wide field of view, at varying angles of illumination. However, Fourier ptychography microscopy-based reconstruction of high-resolution image may be computationally intensive and therefore time consuming. Therefore, implementing such method on a general-purpose processing unit may be inefficient.

There are other methods available for reconstruction of medical image that may include post processing of medical images on a standard microscope. Other methods include use of reconstruction algorithms that require a use of graphical processing units for computation.

Currently, there is no way in which medical images may be processed that are less time consuming or not computationally intensive.

SUMMARY AND DESCRIPTION

The object of the disclosure is therefore to provide a method and a system that enables effective and fast processing of medical images.

The scope of the present disclosure is defined solely by the appended claims and is not affected to any degree by the statements within this summary. The present embodiments may obviate one or more of the drawbacks or limitations in the related art.

In certain examples, a method for providing effective and fast processing of medical images includes receiving a medical image from a source. The medical image may include a plurality of objects. The objects may include clinically relevant objects and clinically non-relevant objects. The clinically relevant objects may include white blood cells (WBCs), urine sediments, pathogens, etc. In an embodiment, the medical image may be of a microscopic view of a blood smear. Alternatively, the medical image may include microscopic view of urine analysis sample. The medical image may be a low resolution brightfield image. In a further embodiment, the medical image may be obtained by combining one or more brightfield images which are captured at monochromatic illuminations using red, green and blue LEDs. The medical image may be stored in a database and thereafter received by a processing unit from the database. Alternatively, the medical image may be received directly from a source with which the medical image may be captured, such as an image capturing device.

The method further includes segmenting at least one object from the plurality of objects from the medical image.

The segmented object may be a clinically relevant object which may require further clinical analysis. In an embodiment, the segmentation of the at least one object may be performed based on morphological characteristics associated with the at least one object. The method includes identifying at least one region of interest in the medical image, wherein the region of interest includes the at least one object. The region of interest may be determined based on the segmented clinically relevant object in the medical image. Further, the method includes generating a high-resolution image of the region of interest. In an embodiment, the high-resolution image of the region of interest may be generated using Fourier ptychography microscopy-based image reconstruction. Further, the method includes displaying the high-resolution image of the region of interest on a display unit. Advantageously, the method enables faster processing of the medical image as the computation time required to process the medical image is reduced.

According to an embodiment, segmenting the object from the medical image may include generating a hue, saturation, value (HSV) image from a red, green, blue (RGB) image, wherein the medical image is an RGB image. Hue is a dominant color observed by a human eye. Saturation is an amount of white light assorted with hue. Value refers to brightness or intensity of the image. HSV color space separates image intensity from color information present in an image. HSV image may be generated using any of the image processing tools known in the art. Further, the method includes generating a binary mask from the HSV image, wherein the binary mask is generated by applying a threshold associated with HSV channels combined or either of the HSV channels. The threshold may be determined based on the HSV image, a lower range of color observed in the HSV image, and a higher range of color observed in the HSV image. Advantageously, the binary mask enables removal of background information from the medical image and only the objects of clinical relevance remain. The method further includes segmenting the object using the generated binary mask from the HSV/original RGB color image. Advantageously, the binary mask enables effective identification of the object to be segmented in the medical image. Therefore, only relevant portions of the medical image are processed thereby reducing computation time.

According to another embodiment, identifying at least one region of interest includes performing a morphological erosion of the binary mask of the HSV image. Morphological erosion enables erosion of boundaries of the segmented objects. Therefore, any noise in the segmented image is removed. Further, the method includes performing a morphological dilation of the binary mask of the HSV image. Morphological dilation of the binary mask enables gradual enlargement of the segmented object. Therefore, morphological dilation balances any shrinking of the segmented object that may be caused due to morphological erosion.

The method further includes determining a set of characteristics associated with the object from the morphologically dilated binary mask of the HSV image. For example, the set of characteristics may include perimeter associated with the object, convex area of the object, and/or eccentricity of the object. In an embodiment, the characteristics associated with the object may have pre-defined threshold based on which the region of interest associated with the object may be identified. The set of characteristics associated with the object enable the identification of right objects/clinically relevant objects in the medical image from the plurality of objects present in the medical image. Therefore, the method further includes determining if the set of characteristics associated with the object meet the pre-defined criteria. If the set of characteristics meet the pre-defined criteria, the at least one region of interest associated with the object is identified. The region of interest may be a region surrounding the perimeter of the object. Advantageously, the region of interest associated with the object is accurately determined. Therefore, the clinically relevant objects are analyzed effectively.

In an alternate embodiment, other segmentation methods known in the art may also be used. For example, such segmentation methods may be based on color, shape, contrast, etc. For example, the segmentation methods may include super pixel-based segmentation, histogram-based segmentation, clustering based segmentation, machine learning based segmentation methods, etc.

According to an embodiment, the method further includes fusing the high-resolution image of the region of interest with the low-resolution medical image. Further, the resolution of the low-resolution medical image may be enhanced using methods such as interpolation and/or wavelet-fusion. Wavelet-fusion enables fusing the high-resolution image from FPM reconstruction process with the low-resolution medical image. Wavelet-fusion method enables extraction of features from the images using image transformation and decomposition processes. Advantageously, a single image may be generated that includes the region of interest in high resolution and the remaining portions of the medical image. This also allows for comparison between the object in the region of interest and the plurality of objects present in the remaining portions of the medical image.

A system for processing a medical image is also disclosed. The system includes one or more processing units, a medical database coupled to the one or more processing units, the medical database including a plurality of medical images. The system further includes a memory coupled to the one or more processing units. The memory includes an image processing module configured to perform the method acts as described above.

The disclosure relates in one aspect to a computer program product including a computer program, the computer program being loadable into a storage unit of a system, including program code sections to make the system execute the method disclosed herein when the computer program is executed in the system.

The disclosure relates in one aspect to a computer-readable medium, on which program code sections of a computer program are saved, the program code sections being loadable into and/or executable in a system to make the system execute the method disclosed herein when the program code sections are executed in the system.

The realization of the disclosure by a computer program product and/or a computer-readable medium has the advantage that already existing management systems may be easily adopted by software updates in order to work as proposed by the disclosure.

The computer program product may be a computer program or include another element apart from the computer program. This other element may be hardware, (e.g., a memory device on which the computer program is stored, a hardware key for using the computer program, and the like), and/or software, (e.g., a documentation or a software key for using the computer program).

BRIEF DESCRIPTION OF THE DRAWINGS

The present disclosure is further described hereinafter with reference to illustrated embodiments shown in the accompanying drawings, in which.

DETAILED DESCRIPTION

Figure 1:
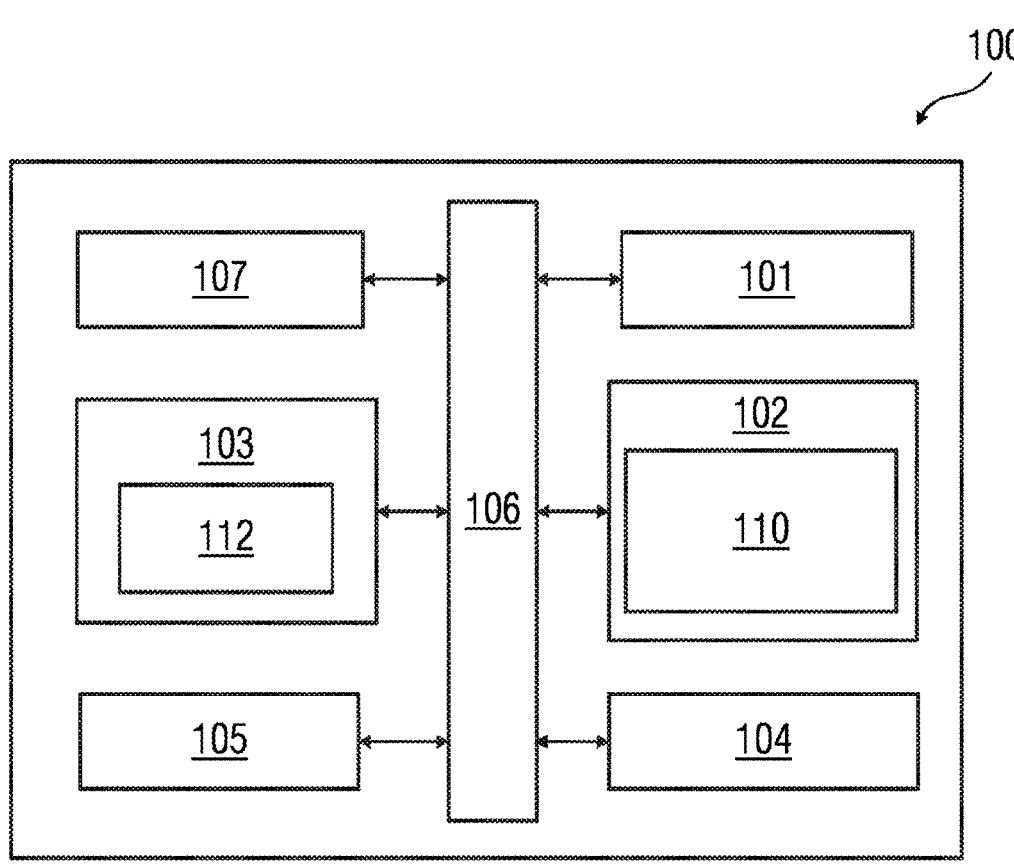
FIG. 1 illustrates a block diagram of a device in which an embodiment for processing a medical image may be implemented.

Hereinafter, embodiments for carrying out the present disclosure are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

In the following, the solution according to the disclosure is described with respect to the claimed providing systems as well as with respect to the claimed methods. Features, advantages, or alternative embodiments herein may be assigned to the other claimed objects and vice versa. In other words, claims for the providing systems may be improved with features described or claimed in the context of the methods. In this case, the functional features of the method are embodied by objective units of the providing system.

FIG. 1 is a block diagram of a system 100 in which an embodiment may be implemented, for example, as a system 100 for processing a medical image, configured to perform the processes as described therein. In FIG. 1, the system 100 includes a processing unit 101, a memory 102, a storage unit 103, an input unit 104, a bus 106, an output unit 105, and a network interface 107.

The processing unit 101, as used herein, may refer to any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 101 may also include embedded controllers, such as generic or programmable logic devices or arrays, application specific integrated circuits, single-chip computers, and the like.

The memory 102 may be volatile memory and non-volatile memory. The memory 102 may be coupled for communication with the processing unit 101. The processing unit 101 may execute instructions and/or code stored in the memory 102. A variety of computer-readable storage media may be stored in and accessed from the memory 102. The memory 102 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 102 includes an image processing module 110 stored in the form of machine-readable instructions on any of the above-mentioned storage media and may be in communication to and executed by processor 101. When executed by the processor 101, the image processing module 110 causes the processor 101 to process a medical image. Method acts executed by the processor 101 to achieve the abovementioned functionality are elaborated upon in detail in FIGS. 2, 3, and 4.

The storage unit 103 may be a non-transitory storage medium that stores a medical database 112. The medical database 112 is a repository of medical images that is maintained by a healthcare service provider. The input unit 104 may include an input device or mechanism such as keypad, touch-sensitive display, camera (such as a camera receiving gesture-based inputs), etc. capable of receiving input signal such as a medical image. The bus 106 acts as interconnect between the processor 101, the memory 102, the storage unit 103, the input unit 104, the output unit 105, and the network interface 107.

Those of ordinary skilled in the art will appreciate that the hardware depicted in FIG. 1 may vary for particular implementations. For example, other peripheral devices such as an optical disk drive and the like, Local Area Network (LAN)/ Wide Area Network (WAN)/Wireless (e.g., Wi-Fi) adapter, graphics adapter, disk controller, or input/output (I/O) adapter also may be used in addition or in place of the hardware depicted. The depicted example is provided for the purpose of explanation only and is not meant to imply architectural limitations with respect to the present disclosure.

A system 100 in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through a pointing device. The position of the cursor may be changed and/or an event such as clicking a mouse button, generated to actuate a desired response.

One of various commercial operating systems, such as a version of Microsoft Windows™, a product of Microsoft Corporation located in Redmond, Washington, may be employed if suitably modified. The operating system is modified or created in accordance with the present disclosure as described.

Disclosed embodiments provide systems and methods for processing medical images.

Figure 2:
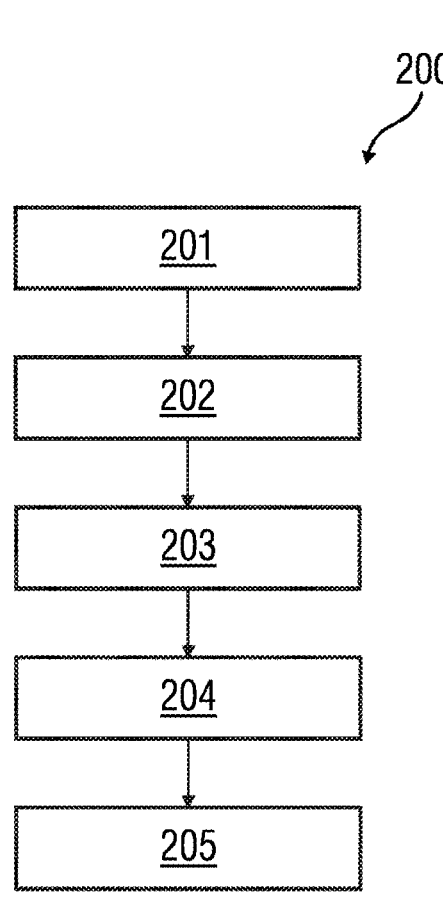
FIG. 2 illustrates a flowchart of a method of processing a medical image, according to an embodiment.

FIG. 2 illustrates a flowchart of a method 200 of processing a medical image, according to an embodiment. At act 201, the medical image is received from a source such as the medical database 112 or a microscope. The medical image is a microscopic image of a sample obtained from an individual. The sample may be blood, urine, tissue sample, cerebrospinal fluid, etc. In the present embodiment, the medical image is a microscopic image of a blood smear. The image includes a plurality of objects including white blood cells (WBCs) and red blood cells (RBCs). The plurality of objects may include one or more objects of clinical relevance. Such objects of clinical relevance may be the ones which may be analyzed further, for example, to determine a medical condition in a patient. In an embodiment, the medical image is a low-resolution brightfield image obtained at monochromatic illuminations using red, green, and blue LEDs. A colored medical image may be generated by combining monochromatic red, green, and blue low-resolution brightfield images which are captured while illuminating the blood smear with the respective LED colors. Alternatively, the low-resolution brightfield image may be obtained using white light, filtered, multispectral illumination including UV or infrared light with a monochrome/ color camera.

The method 200 further includes segmenting 202 at least one object from the plurality of objects in the medical image. The method acts illustrating the segmentation of the at least one object in the medical image is disclosed in further detail in FIG. 3. Segmentation enables selecting the most clinically relevant objects from the plurality of objects present in the medical image. At act 203, at least one region of interest is identified in the medical image, wherein the region of interest includes the at least one clinically relevant object. At act 204, a high-resolution image of the region of interest is generated. For example, Fourier ptychography microscope-based reconstruction may be used to generate the high-resolution image of the region of interest. A Fourier spectrum is iteratively updated with low-resolution images that converges to a high-resolution image. Further, at act 205, the high-resolution image of the region of interest is displayed on a display unit of the output unit 105. In an embodiment, resolution of the remaining portion of the medical image may be enhanced using techniques such as interpolation or wavelet fusion.

Figure 3:
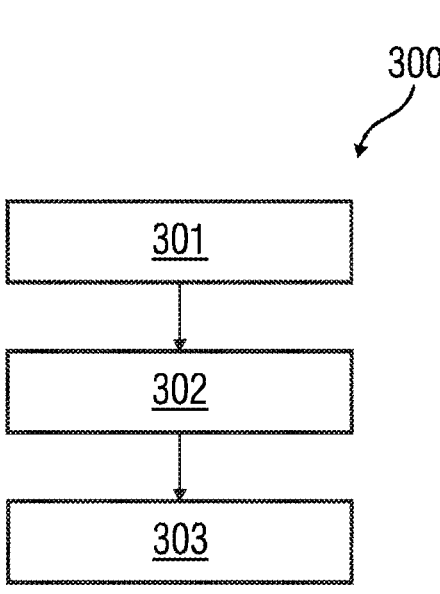
FIG. 3 illustrates a flowchart of a method of segmenting an object in the medical image, according to an embodiment.

FIG. 3 illustrates a flowchart of a method 300 of segmenting the object in the medical image, according to an embodiment. At act 301, a hue, saturation, value (HSV) color image is generated from a red, green, blue (RGB) image, wherein the medical image is an RGB image. In an embodiment, the RGB image is converted to the HSV color space using image processing techniques known in the art. At act 302, a binary mask is generated using the HSV image. A threshold is applied to the HSV image to generate the binary mask. The threshold may be determined based on the medical image, a lower range pixel value in the medical image and a higher range of pixel value in the medical image. The ranges may be determined based on the pixel values present in the medical image. The binary mask is an array of 1s and 0s where 1 indicates pixel values within the lower and higher range of color in the medical image and 0 indicates pixel values outside the lower and higher range of color in the medical image. At act 303, the object falling in the array of 1 in the binary mask is segmented.

Figure 4:
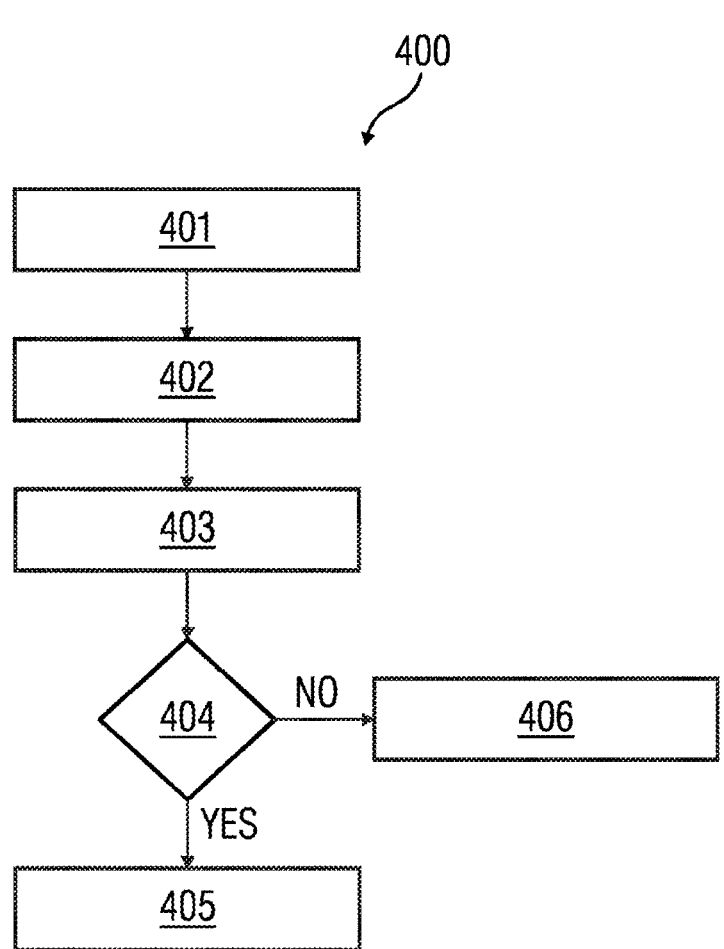
FIG. 4 illustrates a flowchart of a method of identifying at least one region of interest in the medical image, according to another embodiment.

FIG. 4 illustrates a flowchart of a method 400 of identifying at least one region of interest, according to an embodiment. At act 401, a morphological erosion of is performed on the binary mask obtained from the HSV image. Morphological erosion is applied to the binary image obtained as an outcome of the segmentation. The boundaries of the object in the binary image are eroded by an erosion operator. The erosion operator uses the binary image as a first input and a set of coordinate points in the binary image as a second input. The set of coordinate points is also known as structuring element or kernel. The effect of erosion on the binary image is determined by the kernel. At act 402, a morphological dilation of the binary mask is performed. Morphological dilation enables gradual enlargement of the boundaries of the binary image. The dilation is performed by a dilation operator which also considers the binary image and the structuring element as the first and second inputs respectively. Dilation also enables edge detection of the object in the binary image.

At act 403, a set of characteristics associated with the object is determined with the help of the morphologically dilated binary mask. The set of characteristics include, but are not limited to, perimeter associated with the object, convex area of the object, and eccentricity of the object. In particular, the convex area and the eccentricity of the object enable effective determination of the object of clinical relevance in the medical image. The perimeter of the object enables identification of the region of interest. At act 404, it is determined if the set of characteristics associated with the object meet a pre-defined criteria. The pre-defined criteria may be defined based on the object of clinical relevance. For example, if the object of clinical relevance is a WBC, the pre-defined criteria may be the size of the WBC. If the pre-defined criteria are met, the at least one region of interest is identified associated with the object, at act 405. If the pre-defined criteria are not met, at act 406, the object is identified as not a clinically relevant object.

The advantage of the disclosure is the method and system enable effective computation of medical images. As only selective regions of interest are used for computational FPM, the overall time take for processing and analyzing the medical image is significantly reduced. Additionally, as wide field of view is provided by FPM, the most relevant regions of interest are identified using the low-resolution medical image. Therefore, complex and expensive raster scan mechanisms are avoided.

The foregoing examples have been provided merely for the purpose of explanation and are in no way to be construed as limiting of the present disclosure. While the disclosure has been described with reference to various embodiments, it is understood that the words, which have been used herein, are words of description and illustration, rather than words of limitation. Further, although the disclosure has been described herein with reference to particular means, materials, and embodiments, the disclosure is not intended to be limited to the particulars disclosed herein; rather, the disclosure extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosure in its aspects.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method of processing a medical image, the method comprising:

receiving, by a processing unit, the medical image, wherein the medical image comprises a plurality of objects, and wherein the medical image is a low-resolution image;

segmenting, by the processing unit, at least one object from the plurality of objects from the medical image comprising: generating a hue, saturation, value (HSV) image from a red, green, blue (RGB) image, wherein the medical image is a RGB image; generating a binary mask from the HSV image by applying a threshold associated with the HSV image, wherein the threshold is applied to at least one channel of HSV color space associated with the HSV image; and segmenting the at least one object from the binary mask obtained from the HSV image;

identifying, by the processing unit, at least one region of interest in the medical image, wherein the region of interest comprises the at least one object, and wherein the at least one object is a clinically relevant object;

generating, by the processing unit, a high-resolution image of the region of interest, wherein the high-resolution image of the region of interest has a higher resolution than the low-resolution image; and displaying, by the processing unit, the high-resolution image of the region of interest on a display unit.

2. The method of claim 1, wherein the clinically relevant object comprises white blood cells, urine sediments, cancerous cells, circulating tumor cells, pathogens, or combinations thereof.

3. The method of claim 1, wherein the identifying of the at least one region of interest comprises:

performing a morphological erosion of the binary mask generated from the HSV image;

performing a morphological dilation of the binary mask generated from the HSV image;

determining a set of characteristics associated with the at least one object from the morphologically dilated binary mask of the HSV image;

determining when the set of characteristics associated with the at least one object meet a pre-defined criteria; and identifying the at least one region of interest associated with the at least one object when the set of characteristics associated with the at least one object meets the pre-defined criteria.

4. The method of claim 3, wherein the set of characteristics associated with the at least one object comprises a perimeter associated with the at least one object, a convex area of the at least one object, an eccentricity of the at least one object, or a combination thereof.

5. The method of claim 1, wherein the generating of the high-resolution image of the region of interest comprises performing a Fourier ptychographic microscopy reconstruction of the region of interest.

6. The method of claim 1, wherein the medical image is a brightfield image associated with a clinical sample.

7. The method of claim 1, further comprising:

fusing the high-resolution image of the region of interest with the low-resolution image.

8. A system for processing a medical image, the system comprising:

one or more processing units;

a medical database coupled to the one or more processing units, the medical database comprising a plurality of medical images; and a memory coupled to the one or more processing units, the memory and the one or more processing units configured to:

receive a medical image comprising a plurality of objects, wherein the medical image is a low-resolution image;

segment at least one object from the plurality of objects from the medical image by: generation of a hue, saturation, value (HSV) image from a red, green, blue (RGB) image, wherein the medical image is a RGB image; generation of a binary mask from the HSV image by application of a threshold associated with the HSV image, wherein the threshold is applied to at least one channel of HSV color space associated with the HSV image; and segmentation of the at least one object from the binary mask obtained from the HSV image;

identify at least one region of interest in the medical image, wherein the region of interest comprises the at least one object, and wherein the at least one object is a clinically relevant object;

generate a high-resolution image of the region of interest, wherein the high-resolution image of the region of interest has a higher resolution than the low-resolution image; and display the high-resolution image of the region of interest on a display unit.

9. The system of claim 8, wherein the clinically relevant object comprises white blood cells, urine sediments, cancerous cells, circulating tumor cells, pathogens, or combinations thereof.

10. The system of claim 8, wherein the medical image is a brightfield image associated with a clinical sample.

11. The system of claim 8, wherein the memory and the one or more processing units are further configured to:

fuse the high-resolution image of the region of interest with the low-resolution image.

12. A non-transitory storage medium having a computer program product comprising machine readable instructions, that when executed by one or more processing units, cause the one or more processing units to:

receive a medical image comprising a plurality of objects, wherein the medical image is a low-resolution image;

segment at least one object from the plurality of objects from the medical image by: generation of a hue, saturation, value (HSV) image from a red, green, blue (RGB) image, wherein the medical image is a RGB image; generation of a binary mask from the HSV image by application of a threshold associated with the HSV image, wherein the threshold is applied to at least one channel of HSV color space associated with the HSV image; and segmentation of the at least one object from the binary mask obtained from the HSV image;

identify at least one region of interest in the medical image, wherein the region of interest comprises the at least one object, and wherein the at least one object is a clinically relevant object;

generate a high-resolution image of the region of interest, wherein the high-resolution image of the region of interest has a higher resolution than the low-resolution image; and display the high-resolution image of the region of interest on a display unit.

\* \* \* \* \*